United States Patent
Wang et al.

(10) Patent No.: US 11,297,147 B2
(45) Date of Patent: Apr. 5, 2022

(54) MANAGED DATA EXPORT TO A REMOTE NETWORK FROM EDGE DEVICES

(71) Applicant: Amazon Technologies, Inc., Seattle, WA (US)

(72) Inventors: Feng Wang, Seattle, WA (US); Prateek Yadav, Seattle, WA (US); James Gosling, Redwood City, CA (US); Shekar Chandra Bommas, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/712,928

(22) Filed: Dec. 12, 2019

(65) Prior Publication Data
US 2021/0160331 A1 May 27, 2021

Related U.S. Application Data

(60) Provisional application No. 62/939,479, filed on Nov. 22, 2019.

(51) Int. Cl.
| | |
|---|---|
| H04L 29/06 | (2006.01) |
| H04L 67/51 | (2022.01) |
| H04L 67/12 | (2022.01) |
| H04L 67/143 | (2022.01) |
| H04L 67/01 | (2022.01) |

(52) U.S. Cl.
CPC .............. *H04L 67/16* (2013.01); *H04L 67/12* (2013.01); *H04L 67/143* (2013.01); *H04L 67/42* (2013.01)

(58) Field of Classification Search
CPC ....... H04L 67/16; H04L 67/12; H04L 67/142; H04L 67/143
See application file for complete search history.

(56) References Cited

U.S. PATENT DOCUMENTS

| | | | |
|---|---|---|---|
| 6,741,608 B1 * | 5/2004 | Bouis | H04L 65/605 370/465 |
| 9,712,486 B2 | 7/2017 | Johnson et al. | |
| 9,762,556 B2 | 9/2017 | James et al. | |
| 10,007,513 B2 | 6/2018 | Malladi et al. | |
| 2003/0037160 A1 * | 2/2003 | Wall | H04L 47/70 709/233 |
| 2007/0174410 A1 * | 7/2007 | Croft | H04L 67/28 709/208 |

(Continued)

FOREIGN PATENT DOCUMENTS

WO 2015164359 A1 10/2015

OTHER PUBLICATIONS

International Search Report and Written Opinion in PCT/US2020/061422, dated Feb. 11, 2021, pp. 1-12.

*Primary Examiner* — Christopher B Robinson
(74) *Attorney, Agent, or Firm* — Robert C. Kowert; Kowert, Hood, Munyon, Rankin & Goetzel, P.C.

(57) ABSTRACT

Export of data from an edge device to a provider network may be managed. An edge device may receive different data streams from different client devices in a client network. According to an export configuration received at the edge device, one of the data streams may be selected. A next portion of data in the data stream may be identified and the identified portion may be sent to a data stream destination in a remote network by the edge device.

20 Claims, 8 Drawing Sheets

(56) References Cited

U.S. PATENT DOCUMENTS

| | | | |
|---|---|---|---|
| 2010/0049785 A1* | 2/2010 | Stoyanov | H04L 43/08 |
| | | | 709/203 |
| 2010/0146085 A1* | 6/2010 | Van Wie | A63F 13/12 |
| | | | 709/220 |
| 2010/0274848 A1* | 10/2010 | Altmaier | H04L 67/104 |
| | | | 709/203 |
| 2015/0244826 A1 | 8/2015 | Stenneth | |
| 2017/0164379 A1 | 6/2017 | Karlsson et al. | |
| 2017/0289240 A1* | 10/2017 | Ghare | H04L 67/10 |

* cited by examiner

MANAGED DATA EXPORT TO A REMOTE NETWORK FROM EDGE DEVICES

RELATED APPLICATIONS

This application claims benefit of priority to U.S. Provisional Application Ser. No. 62/939,479, entitled "MANAGED DATA EXPORT TO A REMOTE NETWORK FROM EDGE DEVICES," filed Nov. 22, 2019, and which is incorporated herein by reference in its entirety.

BACKGROUND

With the increased availability of different smart devices that access the internet, many new applications have been developed that leverage internet connectivity. The Internet of Things (IoT) is a phrase given for the interconnection of computing devices scattered around the globe within the existing internet infrastructure. IoT devices may be embedded in a variety of products, such as home appliances, manufacturing devices, printers, automobiles, thermostats, smart traffic lights, environmental sensors, etc.

Due to the large volume of data generated across numerous IoT devices, it may be helpful to aggregate the generated data in a cloud service. For example, data from many different IoT devices may be processed by a cloud service using data processing techniques for analysis or to perform various functions in response to received data. However, exporting data from diverse locations to remote services may have to contend with changing environmental conditions, such as changes to network connectivity to send data to remote services. Therefore, techniques that increase the capabilities of exporting data to remove services from different devices are highly desirable.

Figure 1:
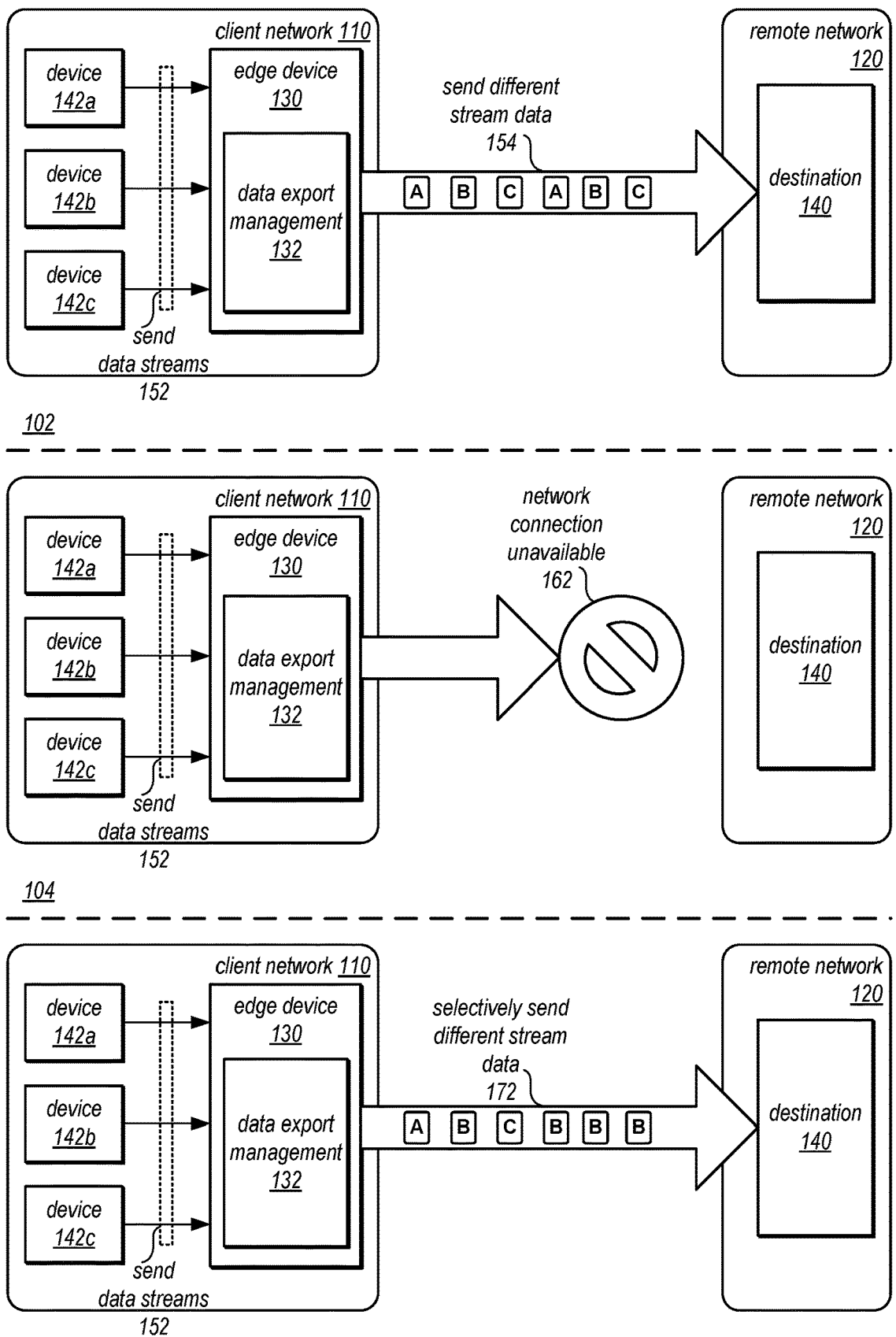
FIG. 1 illustrates a series of logical block diagrams of managed data export to a remote network from edge devices, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as described by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various techniques for managed data export to a remote network from edge devices are described herein. Remote networks offer various storage, computational, and other services which may be utilized by various client networks, systems, applications, or devices to complete, enhance, control or otherwise interact with different services or applications that are implemented on the clients. Moreover, remote networks offer scalable resources to provide greater durability availability for the applications on the clients. Therefore, in various scenarios data generated on clients, such as various types of machine-generated data (e.g., sensor readings) or human-generated data (e.g., user interface actions, such as voice, touch, or other inputs) may be transmitted to one (or more) services of a remote network as part of performing an application.

An edge device, such as computing device 1000 discussed below with regard to FIG. 8, may be implemented in some embodiments to serve as an access and/or coordination point for interactions between clients and a remote network, in various embodiments. For example, an edge device may provide a local execution environment for various features of services of a remote network, such as a provider network discussed below in FIG. 2, that can be performed locally before a request or communication is sent to a service in the remote network. Clients may send data to an edge device, in various embodiments, in order to take advantage of features and/or capacities of the edge device, such as a local execution environment for services of a remote network to implement various features of an application that would otherwise have to be executed at a service of the remote network. The local execution environment can then selectively determine whether further action or requests should be performed at services of the remote network.

In scenarios where data from a client is to be stored, processed, or otherwise handled at a service of the remote network, an edge device may implement various techniques to manage the export of the data to a target service or other data stream destination in the remote network. Given the unpredictable nature of network connectivity, an edge device may implement managed data export to handle data export on behalf of different clients that accounts for changes in network connectivity. For instance, in scenarios of limited bandwidth capacity to send data, managed data export can automatically select which data to prioritize for export in the event some data may be more important than other data (e.g., an alarm event may be more important than an individual sensor reading).

FIG. 1 illustrates a series of logical block diagrams of managed data export to a remote network from edge devices, according to some embodiments. Remote network 120 (which may be similar to provider network 200 or other types of remote networks) may implement one or more service(s) 140 that accept data generated at different devices remote from the remote network for storage, analysis, or other processing. For example, different devices, such as devices 142a, 142b, and 142c (which may, for example, be various computing or electronic devices that can receive, capture, or generate data and transmit the data, such as one or more computing devices 1000 or other devices with embedded processing and network capabilities), may send data as a data stream (e.g., comprising various objects, chunks, messages, records, or other portions of data) to service 140.

Rather than impose the cost of implementing direct communications for each of these devices 142, a client network 110 (e.g., an on-premise network, a private network, a virtual private network, or other network that is physically or logically isolated from remote network 120) may facilitate communications to send the data streams 152 to another device, such as edge device 130 (e.g., a computing device or system 1000 in FIG. 8 below or any other networking and computing device that can accept and send data streams and implement data export management 132). In this way, edge device 130 can implement the various connections, protocols, interfaces, and other features used to communicate with service(s) 140. In various embodiments, edge device 130 may implement data export management 132 to handle receiving and sending data streams from devices 142 to service(s) 140 in remote network 120.

As noted above, changes in a network connection between edge device 130 and service(s) 140 in remote network 120 can occur. In various embodiments, data export management 132 may automatically handle these and other issues related to exporting data to service(s) 140. For example, data export management 132 may handle problems related to network instability by suspending and preserving the state of data export for individual streams (e.g., by checkpoint) when a connection is unavailable, and resuming export when the connection becomes available again. As different data streams may be using and/or competing for network connection bandwidth, data export management 132 may arbitrate and send data from different data streams, as indicated at 154 (e.g., where "A" data may be from a data stream from device 142a, "B" data may be from a data stream from device 142b, and "C" data may be from a data stream from device 142c). In various embodiments, a developer, administrator, or other responsible party may configure data export management 132 by defining, enabling, uploading, and or otherwise provide an export configuration for data streams, as discussed below with regard to FIG. 4. The export configuration for data streams may inform the arbitration amongst data streams and/or the circumstances in which a data stream is sent, as discussed in detail below with regard to FIGS. 3 and 5-7.

For example, as illustrated in scene 102, the respective portions of different data streams, "A," "B," and "C" are interleaved equally for transmission to service(s) 140. Data export management 132 may implement a first-in-first-out (FIFO) scheduling technique (e.g., by implement a FIFO queue) which may send portions of data streams as received. Note that in some embodiments, each data stream may be bound for the same or different respective services.

As illustrated in scene 104, the network connection for sending the data streams from devices 142 in client network 110 may be unavailable, as indicated at 162. However, devices 142 may still be receiving and/or generating additional data to send as respective data streams 152. Data export management 132 may implement techniques to handle the lack of network connectivity, including various storage strategies, including conserving data stream storage according to techniques discussed below with regard to FIG. 7. Some portions of data, for instance, may be dropped or otherwise not stored if storage capacity needs to be preserved for more important data.

As illustrated in scene 106, the network connection may become available. Data export management 132 may send different data stream data, as indicated at 172. In some scenarios priority or other selection schemes may be applied to determine an ordering in which portions of data should be sent. For example, in the illustrated example, "B" portions of data (which may have been stored for transmission along with portions for "A" and "C" data streams) are selected before sending "A" and "C" portions. As discussed in detail below with regard to FIGS. 3 and 5, various selection techniques may be applied, which may be configured or performed using export configurations for the data streams. For example, different priority values may be assigned to different data streams in order to implement priority scheduling. Supporting configurable export data streams allows for the performance of data export amongst different client devices 142 to be adapted to the design and performance needs of application(s) operating in client network 110, while retaining the benefit of automated data export management. Data export management 132 can, for instance, dynamically adjust which data streams are sent in various circumstances, including changes in network connectivity, improving the performance of applications implemented on devices 142 that utilize service(s) 140. In at least some embodiments, export configurations can include encoding or decoding features that can be specified (e.g., by scripts or other programming languages, libraries, or executable applications) to customize the export of individual data streams bound for different types of service(s).

Please note that the previous description of managed data export to a remote network from edge devices is a logical illustration and thus is not to be construed as limiting as to the implementation of a remote network, service, network connection client network, client device, edge device, or data streams (or portions thereof), including a number or combination of hardware and/or software utilized to implement such features.

This specification begins with a general description of a provider network that implements multiple different services, including an Internet of Things (IoT) service, and/or other services, which may be the target of or involved in the deployment or implementation of managed data export to a provider network from edge devices and a client network with a local execution environment for the provider network which may implement data export management. Then various examples of, including different components/modules, or arrangements of components/module that may be employed as part of implementing the data export management are discussed. A number of different methods and techniques to implement managed data export to a remote network from edge devices are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
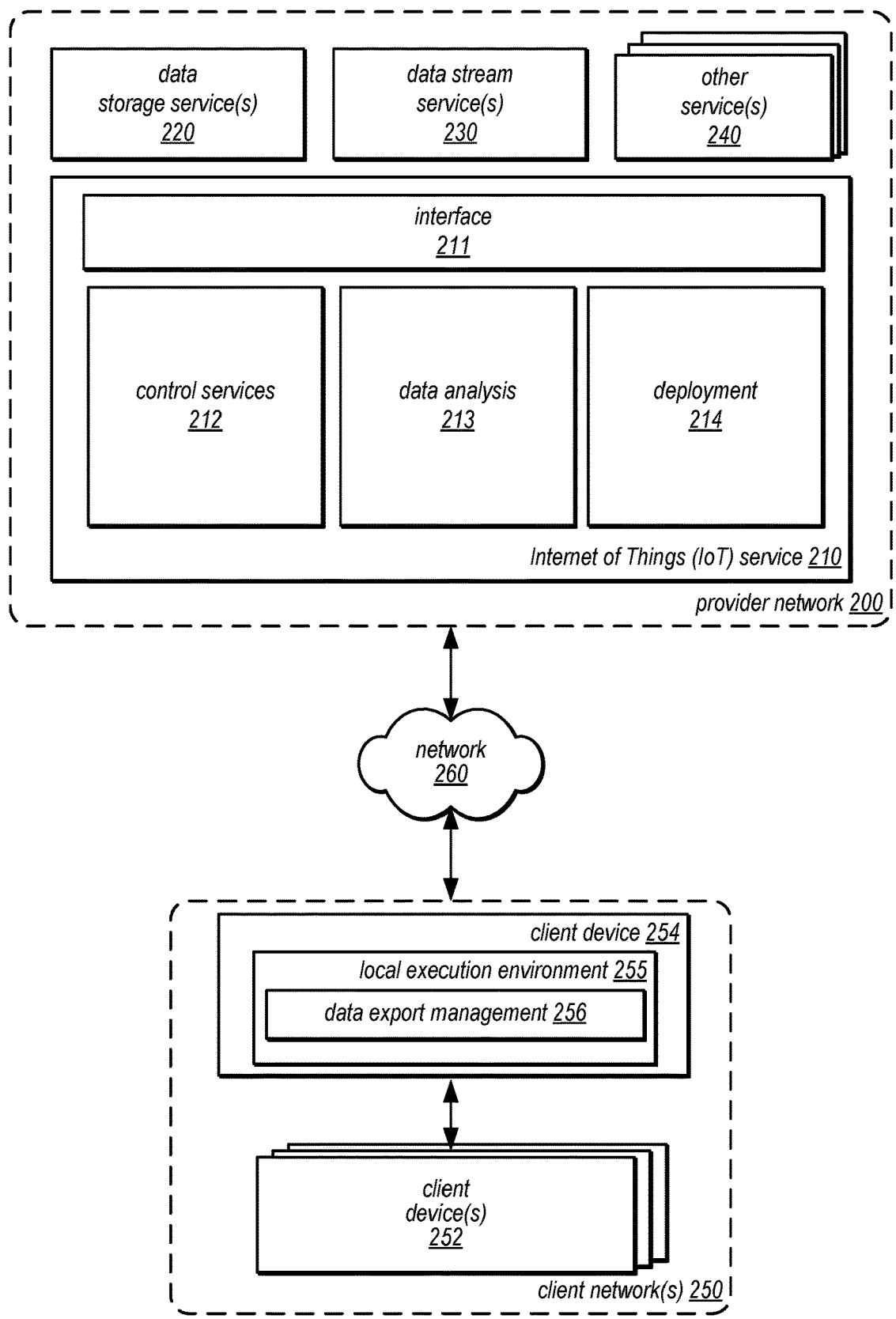
FIG. 2 illustrates an example provider network that may implements services that can receive data exported by a local execution environment in a client network, according to some embodiments.

FIG. 2 illustrates an example provider network that may implements services that can receive data exported by a local execution environment in a client network, according to some embodiments. Provider network 200 may be a private or closed system or may be set up by an entity such as a company or a public sector organization to provide one or more services (such as various types of cloud-based storage) accessible via the Internet and/or other networks to clients 250, in one embodiment. Provider network 200 may be implemented in a single location or may include numerous data centers hosting various resource pools, such as collections of physical and/or virtualized computer servers, storage devices, networking equipment and the like (e.g., computing system 1000 described below with regard to FIG. 8), needed to implement and distribute the infrastructure and services offered by the provider network 200, in one embodiment. In some embodiments, provider network 200 may implement various computing resources or services, such as IoT service 210, data storage service(s) 220, data stream service(s) 230, and/or any other type of network-based services 240 (which may include a virtual compute service and various other types of storage, processing, analysis, communication, event handling, visualization, data cataloging, data ingestion (e.g., ETL), and security services), in some embodiments.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 8 and described below, in one embodiment. In various embodiments, the functionality of a given system or service component (e.g., a component of IoT service(s) 210 may be implemented by a particular node or may be distributed across several nodes. In some embodiments, a given node may implement the functionality of more than one service system component (e.g., more than one data store component).

IoT service 210 may deploy, coordinate and provide for various IoT based applications that utilize various remote devices (e.g., client devices 252 and 254 in client network(s) 250). For example, different client devices implemented in diverse locations, networks, and other scenarios may collect, generated, and interoperate to perform different applications. IoT service 210 may coordinate the interaction of client devices with other services, such as data storage service(s) 220, data stream service(s) 230, or other service(s) 240 (e.g., artificial intelligence or other services that can integrate analysis to provide control or other information to client devices). IoT service 210 may provide security policies or controls that may be enforced in order to ensure data privacy, prevent malicious behavior, and satisfy various industry or governmental regulatory systems. Because IoT service 210 is implemented as part of a provider network, IoT service 210 can provide scalability, availability, durability, and other benefits of a provider network (e.g., cloud service benefits) to provide client applications with the ability to right-size resources to meet demand.

One feature of IoT service(s) 210 that client devices may take advantage of is control services 212. In various embodiments, control services 212 may coordinate the deployment of IoT applications across devices and networks, to provide secure interactions between different client devices. Control service(s) 212 may integrate with or connect to artificial intelligence and other data analysis techniques or services for training and applying machine learning models to add or improve application features of client devices. In some embodiments, control service(s) 210 may monitor and/or audit client device applications to enforce or review security policies or other controls. Control service(s) 212 may provide for remote management of client devices, for IoT application updates, changes, or other tasks or operations to be performed without physical access to a client device.

IoT service 210 may also implement data analysis 213, in some embodiments. Data analysis 213 may include various analytic tools, such as tools to handle structured and unstructured data. Data analysis 213 may, for instance, provide features to filter and transform data streams from client devices into other formats susceptible to better analysis, such as for creating time series data to be stored in a time series database, machine learning data to update or train a machine learning model, or various other analysis (e.g., supporting queries or other requests to obtain data from within a data stream (or group of data streams). In some embodiments, data analysis 213 may be a fully managed feature that scales up or down to handle different loads for receiving, filtering, transforming, and/or storing data streams from client devices. In some embodiments, data analysis 213 may monitor data streams to detect and respond to events.

IoT service 210 may implement deployment 214, in various embodiments. For example, deployment 214 may provide access to configuring and deploying software applications and/or operating systems that support and/or implement IoT applications at the edge of a provider network in a client network, such as client network(s) 250. For example, deployment 214 may provide an operating system for microcontrollers or other low-power edge devices that implements network connectivity and other features that support interactions amongst, for instance, other devices in client network(s) 250, without straining the limited processing resources often available in such devices. In various embodiments, deployment 210 may provide a local execution environment, such as local execution environment 255 (or edge device 130 in FIG. 1). As discussed below with regard to FIG. 4, data export management, such as data export management 256 (or data export management 132), may be configured and deployed by deployment 214.

Figure 5:
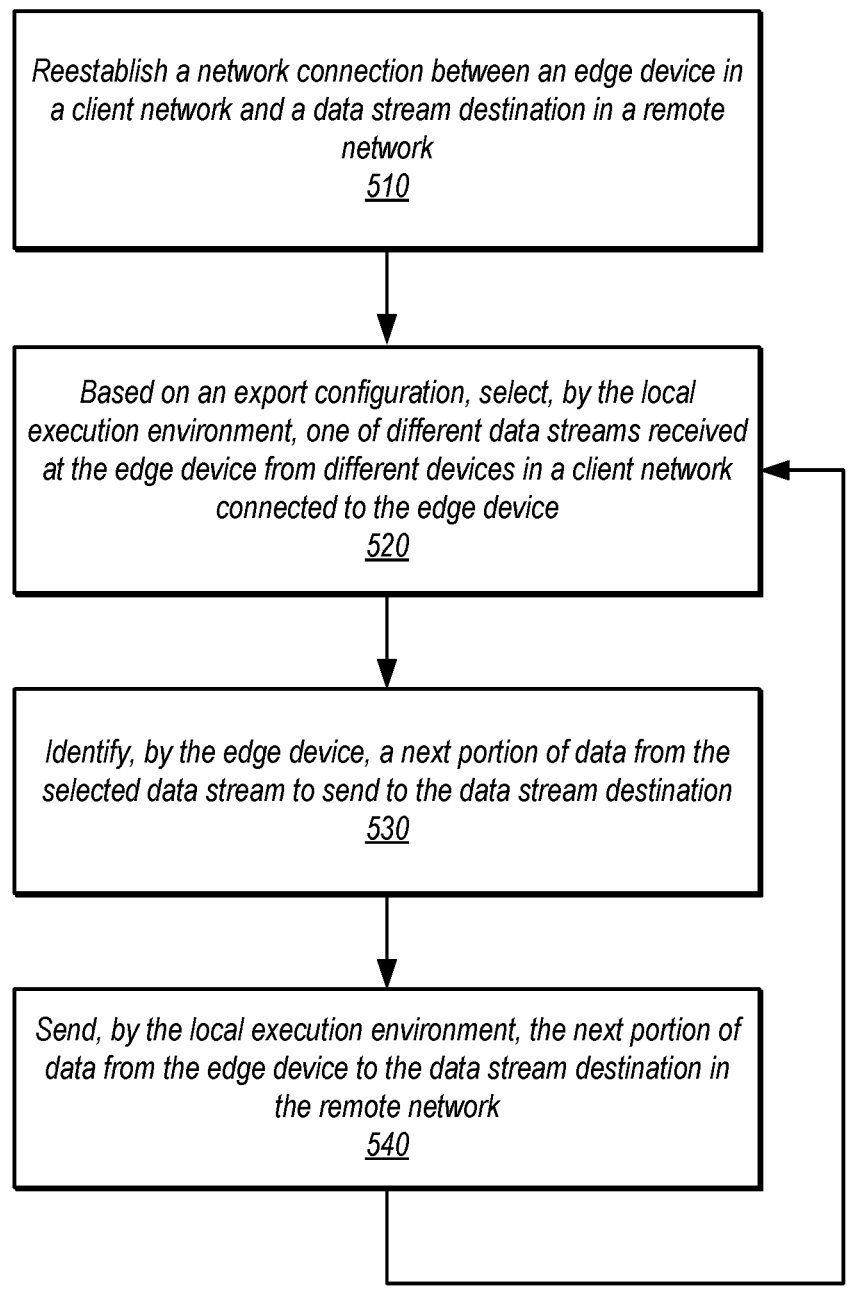
FIG. 5 illustrates a high-level flowchart of various methods and techniques to implement managed data export to a remote network from edge devices, according to some embodiments.
Figure 6:
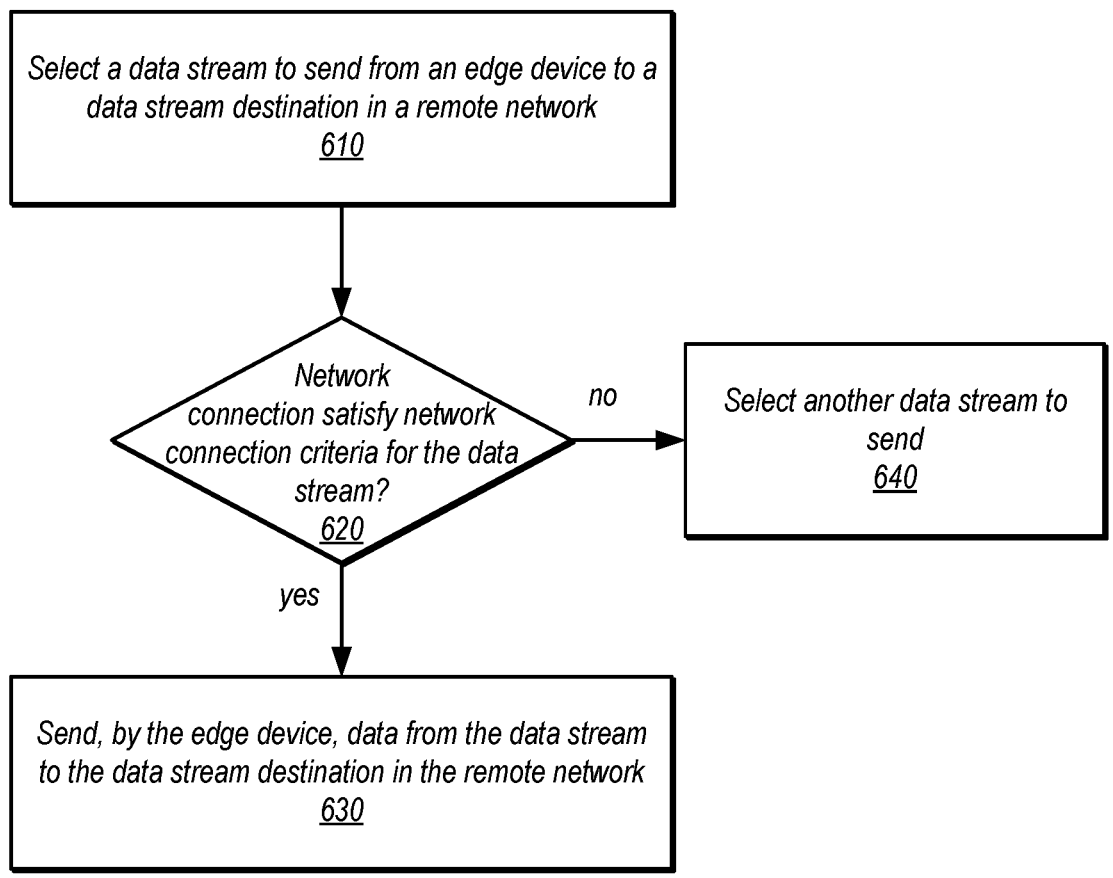
FIG. 6 illustrates a high-level flowchart of various methods and techniques to implement evaluate network connection criteria for exporting data from a data stream at an edge device, according to some embodiments.
Figure 7:
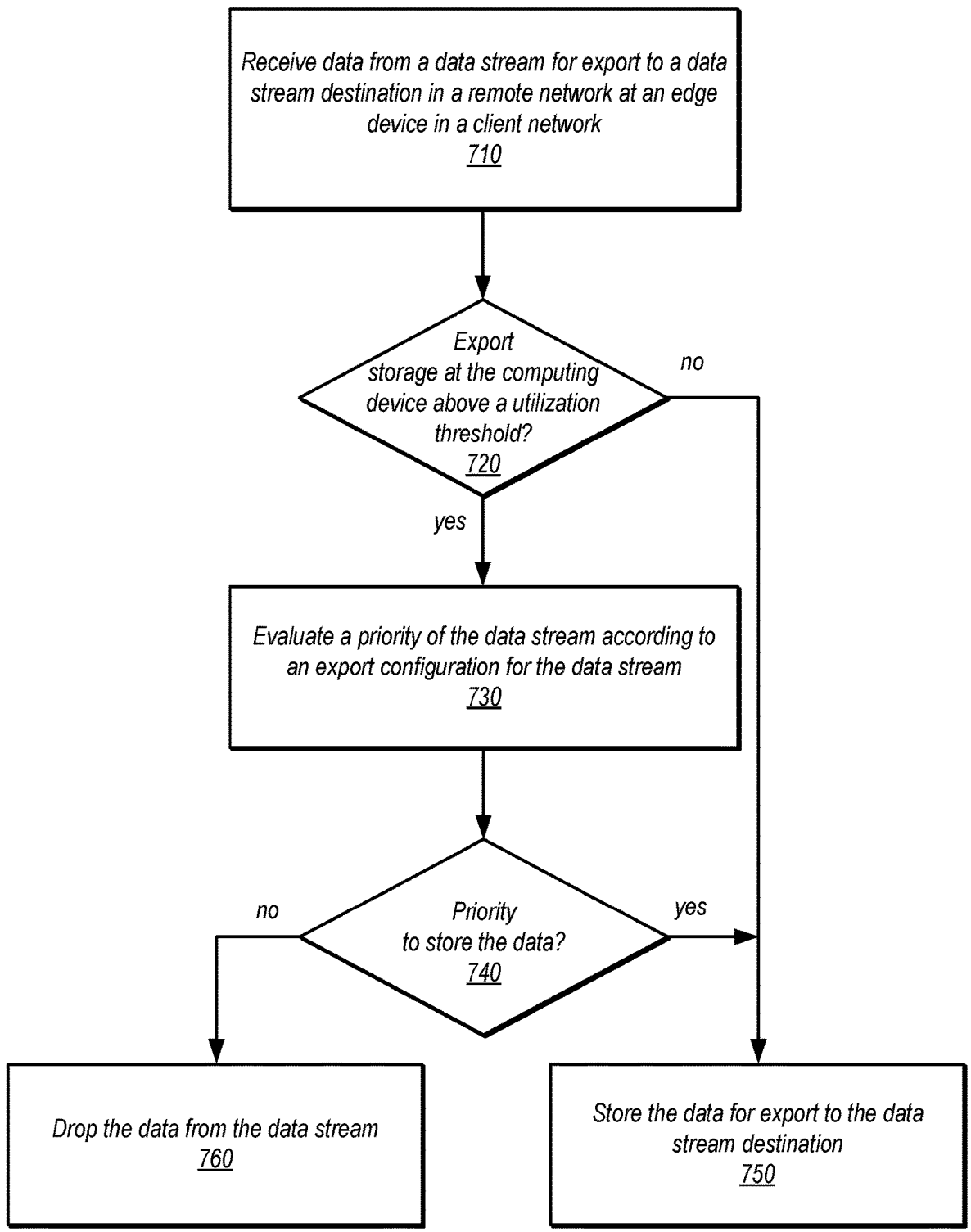
FIG. 7 illustrates a high-level flowchart of various methods and techniques to implement storing data received from a data stream at an edge device for export to a target service or other data stream destination, according to some embodiments.

Edge devices, likes those illustrated in FIGS. 1, 2 and discussed below with regard to FIGS. 5-7, may in various embodiments, provide an execution environment to perform various IoT service 210 and other provider network 200 service(s) features, which may be performed without network connectivity. For example, a local execution environment hosted on an edge device may support programming or interacting with various event driven functions or operations, messaging platforms, security features, as well as connectors to provider network 200 services, third-party applications, or local (e.g., on-premise) applications within a client network. In this way, applications implemented on local devices can connect to and utilize a local execution environment to perform various operations, receive instructions, report data, or other application tasks as if local execution environment were provider network 200, in some embodiments. As discussed in detail below with regard to FIG. 3, managed data export, such as data export management 256 (or data export management 132 in FIG. 1) may be implemented as part of local execution environments on edge devices.

IoT service 210 may implement interface 211, in various embodiments. Interface 211 may be one or multiple types of interfaces to access IoT service, both programmatically and on-behalf of users to perform control or management operations. For example, interface 211 may include one or more programmatic interfaces (e.g., application programming interfaces (APIs)) which allow client devices to invoke or request various IoT service operations (e.g., to invoke data analysis 213 or report monitoring information for control services 212). In some embodiments, interface 211 may include a command or control console, implemented as a command line interface and/or a graphical user interface (e.g., implemented as web-based console) to configure or perform various IoT service features, such as the data export configuration features discussed below with regard to FIG. 4.

In various embodiments, provider network 200 may implement other services which may be the target or destination of data being exported by data export management 256. Data storage service(s) 220 may implement different types of data stores for storing, accessing, and managing data on behalf of clients as a network-based service that enables clients to operate a data storage system in a cloud or network computing environment, in some embodiments. For example, data storage service(s) 230 may include various types of database storage services (both relational and non-relational) for storing, querying, and updating data. Such services may be enterprise-class database systems that are highly scalable and extensible. Queries may be directed to a database in data storage service(s) 220 that is distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system.

One data storage service 220 may be implemented as a centralized data store so that other data storage services may access data stored in the centralized data store for processing and or storing within the other data storage services, in some embodiments. A may provide storage and access to various kinds of object or file data stores for putting, updating, and getting various types, sizes, or collections of data objects or files. Such data storage service(s) 220 may be accessed via programmatic interfaces (e.g., APIs) or graphical user interfaces. A centralized data store may provide virtual block-based storage for maintaining data as part of data volumes that can be mounted or accessed similar to local block-based storage devices (e.g., hard disk drives, solid state drives, etc.) and may be accessed utilizing block-based data storage protocols or interfaces, such as internet small computer interface (i SCSI).

In at least some embodiments, one of data storage service(s) 220 may be a data warehouse service that utilizes a centralized data store implemented as part of another data storage service 220. A data warehouse service as may offer clients a variety of different data management services, according to their various needs. In some cases, clients may wish to store and maintain large of amounts data, such as sales records marketing, management reporting, business process management, budget forecasting, financial reporting, website analytics, or many other types or kinds of data. A client's use for the data may also affect the configuration of the data management system used to store the data. For instance, for certain types of data analysis and other operations, such as those that aggregate large sets of data from small numbers of columns within each row, a columnar database table may provide more efficient performance. In other words, column information from database tables may be stored into data blocks on disk, rather than storing entire rows of columns in each data block (as in traditional database schemes).

Another service in provider network 200 may be data stream service(s) 230. Data stream service(s) 230 may provide programmatic interfaces (e.g., application programming interfaces (APIs), web pages or web sites, graphical user interfaces, or command-line tools) to enable the creation, configuration and deletion of streams. The programmatic interfaces may also enable the submission, storage, analysis, transformation and/or retrieval of streaming data records in some embodiments. Some clients of the stream management system may develop applications that directly invoke the stream management programmatic interfaces in various embodiments. In at least some embodiments, however, in addition to the stream management interfaces, a higher-level abstraction or application-level processing framework may be provided for customers, which may simplify various aspects of stream processing for those clients that do not wish to develop applications using the lower-level stream management functions supported by the stream management system. Such a framework may provide its own programmatic interfaces (built, for example, on top of the stream management system interfaces), enabling customers to focus more on the business logic to be implemented using stream records than on lower-level stream management operations. The higher-level framework may be implemented as part of the stream management system to provide fully managed data stream.

For example, data stream service(s) 230 may implement a data ingestion system configured to obtain data records of a particular data stream from data producers (e.g., by operating one or multiple ingestion nodes for a data stream). In some embodiments, data records of a stream may be obtained according to a scheme for partitioning the data stream. The partitioning scheme may be selected by a client of data stream service(s) 230 for a data stream such that data records are received from data producer(s) indicating the particular partition to which the data record belongs. However, in some embodiments, a data stream may be fully managed by data stream service(s) 230 and data producer(s) may send data records without any direction for partitioning. Instead, the data ingestion system may assign data records to route the data records to identified partition. Once ingested, stream management service may store obtained data records (e.g., on corresponding storage nodes provisioned for a the data stream). Such storage nodes may record, save, store or otherwise persist the data records on any of various types of storage devices (which may be performed in accordance with a persistence policy for the data stream).

In order to retrieve data from the data stream, stream management service may provide a retrieval system (e.g., implementing retrieval nodes) that may access the stored data records of the data stream. In some embodiments, data retrieval may be performed in response to request from consumers (e.g., stream processing nodes that perform processing on data stream data).

Data stream service(s) 230 may provide an interface that supports one or more sets of programmatic interfaces (e.g., application programming interfaces (APIs), web pages or web sites, graphical user interfaces, or command-line tools) to enable the creation, configuration and deletion of data streams (both client-managed or fully-managed), as well as the submission, storage and retrieval of stream data records in some embodiments. For instance, data producers may be configured to place data records into a data stream by utilizing a client library provided by data stream service(s) 230 to utilize requests, sending a "putRecord" request to data stream service(s) 230 via the interface. Similarly, data consumer(s) may be configured to access data stream service(s) 230 via the interface and utilize the client library provided by data stream service(s) 230 to "getNextRecords" when executing an application to retrieve the next data records to be processed in the data stream.

Other service(s) 240 may also include services that are targets of managed export of data, in some embodiments. For example, other service(s) 240 may include ay be various types of data processing services to perform different functions (e.g., query or other processing engines to perform functions such as anomaly detection, machine learning, data lookup, or any other type of data processing operation). For example, in at least some embodiments, data processing services may include a map reduce service that creates clusters of processing nodes that implement map reduce functionality over data stored in one of data storage services 220. Various other distributed processing architectures and techniques may be implemented by data processing services (e.g., grid computing, sharding, distributed hashing, etc.).

Generally speaking, clients of a provider network may access provider network 200 via network 260. Such clients may convey network-based services requests (e.g., requests to send data from a data stream via network 260), in some embodiments. In various embodiments, network 260 may encompass any suitable combination of networking hardware and protocols necessary to establish network-based-based communications between clients and provider network 200. For example, network 260 may generally encompass the various telecommunications networks and service providers that collectively implement the Internet. Network 260 may also include private networks such as local area networks (LANs) or wide area networks (WANs) as well as public or private wireless networks, in one embodiment. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client and the Internet as well as between the Internet and provider network 200.

Client network(s) 250 may convey communications amongst client device(s) 252 and client device 254, in various embodiments. Similar to network 260, client network(s) 250 may include the hardware (e.g., modems, routers, switches, load balancers, proxy servers, etc.) and software (e.g., protocol stacks, accounting software, firewall/security software, etc.) necessary to establish a networking link amongst client device(s) 252 and client device 254.

Client device(s) 252 may be computing devices, such as computing system 1000 discussed below with regard to FIG. 8. In some embodiments, client device(s) 252 may be various sensors, appliances, equipment, or other devices that may implement a microcontroller or other processing components that can capture, generate, and send data (e.g., as a data stream as discussed above with regard to FIG. 1) to other client devices 252 in client network(s) 250 and client device 254. Client device 254 may be various types of computing device, like computing system 1000 in FIG. 8, or other edge device, such as various types of gateway devices.

Figure 3:
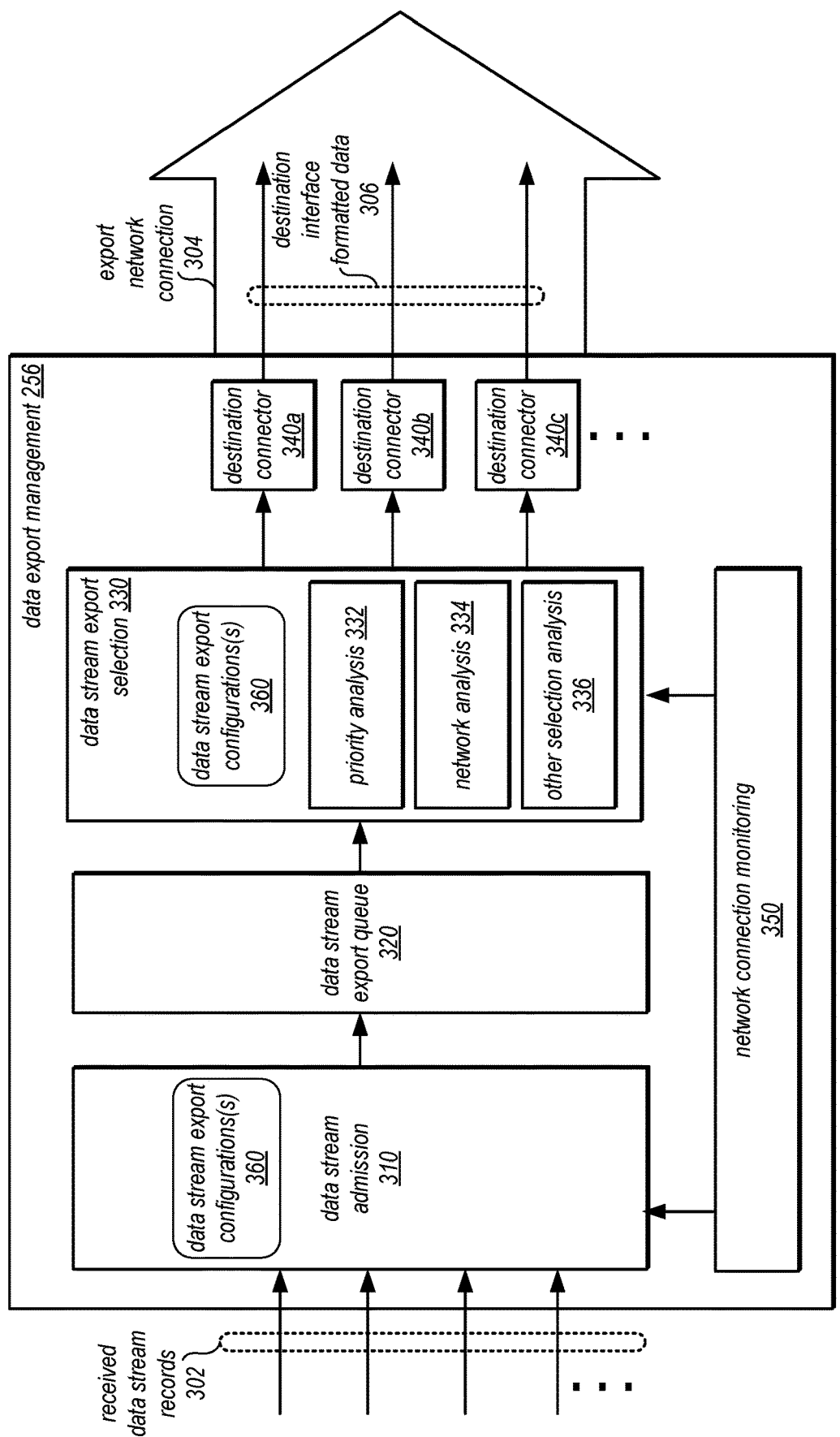
FIG. 3 illustrates a logical block diagram for a data export manager, according to some embodiments.

Client device 254 may implement local execution environment 255 and data export management 256 to provide managed export of data streams. FIG. 3 illustrates a logical block diagram for a data export manager, according to some embodiments. Data export management 256 may be configured by and/or use data stream export configuration(s) 360 specified by client devices (as discussed below with regard to FIG. 4), which may specify handling of data streams received and handled by data export management 256.

For example, data stream export configuration(s) 360 may specify a priority value, label, or other designation that data stream admission 310 may use when data stream records are received, as indicated at 302. For example, data stream admission 310 may implement throttling or other resource conservation techniques based on the specified priority for data streams when storage capacity for data stream records reaches a threshold utilization (e.g., when a data stream export queue 320 exceeds a number of items or a storage size greater than a size threshold), as discussed below with regard to FIG. 7. Such techniques may be enabled, disabled (or applied with different thresholds) according to network connections state information that may be determined by network connection monitoring 350 and provided to data stream admission 310. For example, if a network connection is active, then data stream admission may not throttle or prioritize admission of some data streams. If a network connection is degraded or not operating at full bandwidth capacity, then some throttling based on high utilization thresholds may be applied, and if the network connection is disconnected or otherwise unavailable, then a lower utilization threshold before throttling may be applied (e.g., to prevent overwriting data when storage capacity is exceeded).

Data stream admission 310 may also apply export configuration(s) 360 for format or information stored in data stream export queue 320. For example, data stream export configuration may specify unneeded or necessary data to be removed, or additional data features to be added to data in a stream before storage in data stream export queue (e.g., adding prefixes, timestamps, identifiers, or other metadata). In some embodiments, a data stream export configuration 360 may specify an allocation or size of data stream export queue 320 (or other storage structure) for a data stream that once full the data for the data stream is blocked or denied.

Data export management 256 may implement data stream export queue 320, in some embodiments. Data stream export queue 320 may be implemented to provide an ordering for selecting data records from different streams (e.g., a FIFO or priority queue) or may be a buffer or other allocated storage space that stores records which are selected by data stream export selection 330.

Data stream export selection 330 may be implemented by data export management 356 in various embodiments to provide a fully managed data export feature for received data streams. Data stream export selection 330 may utilize data stream configurations to perform various kinds of analysis for selecting data streams for export. For example, priority analysis 332 may be performed to select different specified data stream priorities (e.g., "high" "medium" or "low"). In some embodiments, priority analysis 332 that identifies and sends higher priority data may be implemented that will also boost or compensate the priority of waiting data stream records so that no one data stream starves the other data streams. Data stream export selection 330 may implement network analysis 334, as discussed in detail below with regard to FIG. 6, which may perform various types of selections based on the state of export network connection 304, which may be provided by network connection monitoring. Other selection analysis 336 or techniques, such as last-in-first-out (LIFO), round robin, or other selection techniques may be performed as specified or informed by data stream export configuration(s) 260.

In some embodiments, data stream export selection may operate differently according to the state of export network connection 304. For example, if export network connection is healthy or otherwise operation at full capacity, then a FIFO ordering or balanced selection technique may be implemented. However, if a network connection has just been reestablished (e.g., after a failure), then as discussed above with regard to FIG. 1 and below with regard to FIG. 5, a selection technique may selectively choose which data streams to send data for (e.g., according to priority).

As illustrated in FIG. 3, data export management may implement different destination connectors, such as destination connectors 340a, 340b, and 340c, in some embodiments. Destination connectors 340 may format and send data from a stream to a target service or other data stream destination formatted according to the interface at the destination, as indicated at 306. For example, destination connector 340a may format requests to store data stream data as different entries in a database table, while destination connector 340b may form requests to put data stream records as items into a data stream of a data stream service, data stream service 230. In some embodiments, destination connectors may be provided, configured, or uploaded by a user for inclusion in data export management 256 when deploying a local execution environment.

Figure 4:
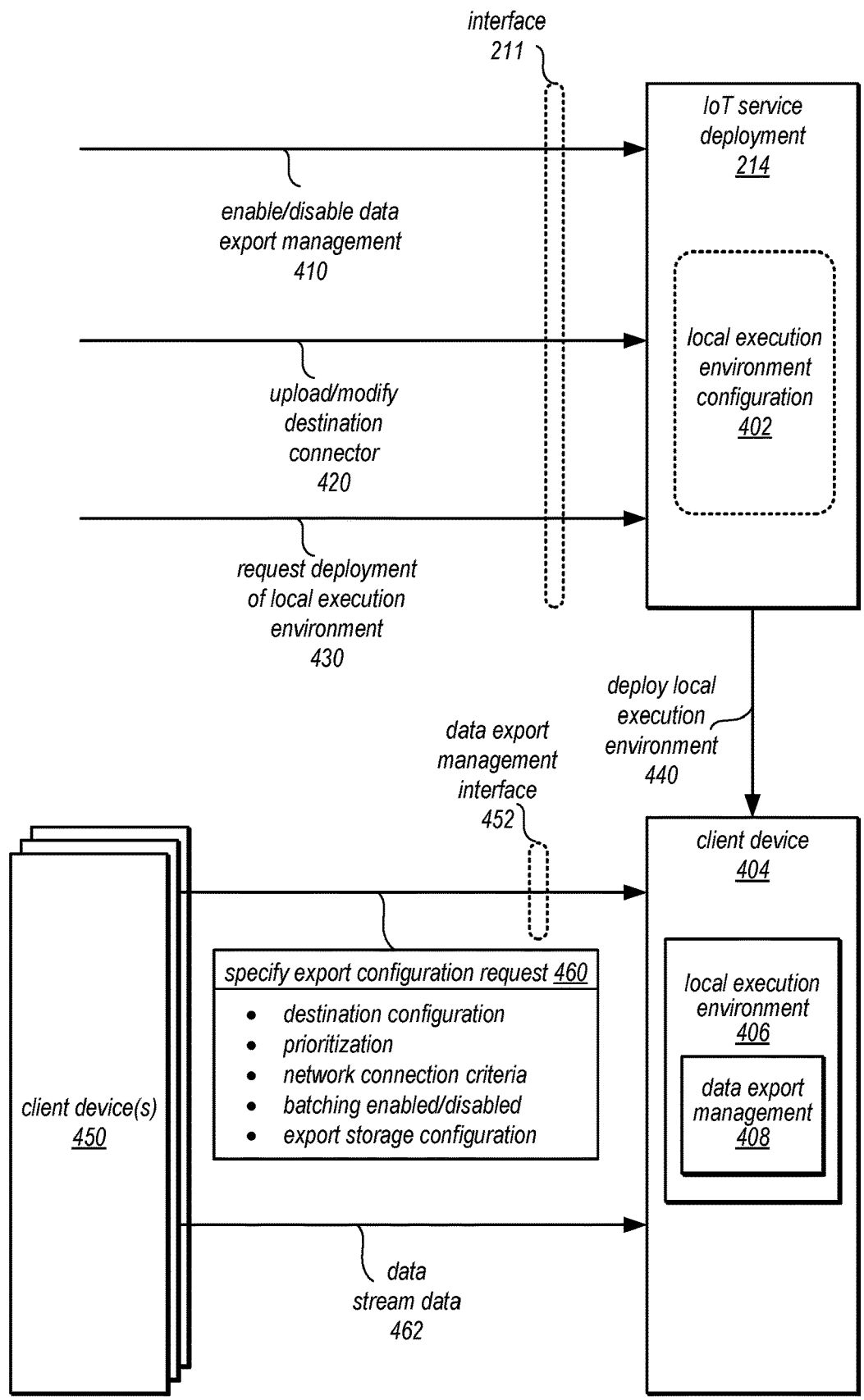
FIG. 4 illustrates a logical block diagram illustrating interactions to configure managed export for a data stream at a local execution environment, according to some embodiments.

As noted earlier, an IoT service 210 may implement a deployment feature, deployment 214, in order to deploy local execution environments and data export managers to edge devices, in some embodiments. FIG. 4 illustrates a logical block diagram illustrating interactions to configure managed export for a data stream at a local execution environment, according to some embodiments. As illustrated in FIG. 4, IoT deployment 214 may maintain a local execution environment configuration 402. Local execution environment configuration 402 may include, among other features, data export management (as discussed above). Deployment 214 may accept various requests via interface 211 to configure and deploy local execution environment configuration 402, in various embodiments.

For example, as indicated at 410, a request to enable (or disable) a data stream management for an identified local execution environment may be received. As indicated at 420, requests to upload or modify a destination connector may also be received, in some embodiments. For example, an executable, script, code, or other information may be provided to define or implement a connector. In some embodiments, actions to edit or modified an existing destination connector (e.g., changing the type of encoding or other aspect of utilizing a connector), may be performed.

As discussed above, deployment 214 may deploy various IoT service applications to recipient devices. For example, a request 430 to deploy a local execution environment (or update an existing version of a local execution environment) may be received. The request may utilize local execution environment configuration 402 as specified or modified according to requests 410 and 420. Deployment 214 may then send or otherwise provide the local execution environment for deployment, as indicated 440, on client device 404 (e.g., an edge device) to be implemented as data export management 408 on local execution environment 406, in some embodiments.

Client device(s) 450 may be client devices that connect to and communication with client device 404 as part of a client network, as discussed above with regard to FIG. 1. Such communications may include one or more requests to create, update, delete, and/or otherwise specify 460 export configurations for respective data streams via data export management interface 452 (e.g., according to one or more APIs), in some embodiments. Various different features, options, parameters, or other criteria may be specified for a data stream (e.g., identified by identifier, source (e.g., client device(s), etc.). For example, a destination configuration may include a target service or other data stream destination, structure, file, endpoint, or object within that service to receive a data stream, formatting for data (e.g., type of connector to use), and/or credentials or other information for accessing the destination by export data management. In some embodiments, configuration request 410 may specify a priority value for the data stream (e.g., by numeric value or label). In some embodiments, the prioritization may be specific to certain conditions (e.g., after reconnection) or may be applied/considered without specific network conditions.

In some embodiments, configuration request 410 may specify network connection criteria. For instance, a minimum bandwidth for exporting data stream data (e.g., to ensure high quality data transmission or speed) may be specified, a type of link (e.g., wireless, wired, satellite, etc.) and/or link cost, or other network connection conditions in which selection behavior may be affected for the data stream. In some embodiments, data stream configuration request 410 may specify whether batching for a data stream is enabled or disabled (e.g., batching a number of records together, a size of records together, and/or an amount of time since a batch of records was sent). In some embodiments, export storage configuration information (e.g., format, additional data to add, whether the data can be overwritten, etc.) may be specified as part of a data stream export configuration request 410. The configuration specified in the request 410 may be included in a data export management feature of local execution environments deployed using local execution environment configuration 402, in some embodiments.

Separate from requests to specify export configurations for data streams, client device(s) 450 may send data stream data, as indicated at 462 to client device 404, which may be exported by data export management 408. For example, a separate interface or protocol for transmitting data streams to client device 404 may be utilized (than interface 452).

Although FIGS. 2-4 have been described and illustrated in the context of a provider network implementing an IoT service, the various components illustrated and described in FIGS. 2-4 may be easily applied to other edge networks that export data to other systems, networks, or services. As such, FIGS. 2-4 are not intended to be limiting as to other embodiments of managed data export to a provider network from edge devices. FIG. 5 illustrates a high-level flowchart of various methods and techniques to implement managed data export to a provider network from edge devices, according to some embodiments. Various different systems and devices may implement the various methods and techniques described below, either singly or working together. For example, a local execution environment implementing data export management as described above may use some or all of the various methods. Therefore, the above examples and or any other systems or devices referenced as performing the illustrated method, are not intended to be limiting as to other different components, modules, systems, or devices.

A network connection may be established between an edge device and a remote network, in various embodiments. For example, various protocols, credential exchanges, and/or other communications may be performed to allow for communications sent from an edge device to a target service or other data stream destination in the remote network. When network connections become available or fail, operation of client devices in a client network may continue by sending data streams to the edge device for later export to a target service or other data stream destination—even though the data streams cannot be executed when the network connection is unavailable (e.g., offline). As indicated at 510, however, a network connection between the edge device and the target service or other data stream destination in the provider network can be reestablished, in some embodiments. In this way, data may once again be able to be exported from the various data streams.

As indicated at 520, based on an export configuration, the edge device may select one of different received data streams at the edge device from different devices in the client network to the computing device, in some embodiments. For example, a selection technique to identify and select the data records, chunks or other portions that have not yet been sent (e.g., as may be identified by a checksum, watermark, or export state for data streams) may be performed to select a highest priority data stream. In some embodiments, the selection technique applied after reestablishing the network connection may be different than the one applied before the network connection become unavailable. As discussed above with regard to FIG. 3, various other analyses or criteria, such as LIFO or other scheduling techniques may be specified in the export configuration, which may be applied alone or in combination.

As indicated at 530, the edge device may identify a next portion of data from the selected data stream to send to the target service or other data stream destination, in some embodiments. For example, a checksum or other indicator of the last sent portion from a data stream may be evaluated. In some embodiments, the next portion may be the next portion of that data stream in FIFO queue or other order preserving structure (which may be removed when exported) may be used to identify the next portion of data from the selected data stream.

As indicated at 540, the next portion of the data may be sent by the edge device to the target service or other data stream destination in the remote network, in some embodiments. For example, the portion of data may be encoded, compressed, encrypted, or otherwise formatted according to the requirements of the target service or other data stream destination, such as converting from one type of data format to another. One or more requests formatted according to an interface (e.g., API) for the target service or other data stream destination may be generated, populated with the next portion of data, and sent. In some embodiments, an acknowledgement or other response may be received in order to update or mark completed export of data (e.g., and to remove the portion of the data stream from a queue by updating the checksum). In some embodiments, the portion may be a batch of records. In some embodiments, a next portion may not be sent until a minimum batch size of records is received for that data stream.

Selection of next data stream to transmit may continue (as indicated by the arrow returning to element 520. In this way, each selection offers the edge device an opportunity to dynamically adjust which data is sent in order to respond to changing conditions (e.g., in terms of data streams submitted or network connection conditions).

Different types of additional evaluations or criteria may be applied after an initial selection of a data stream. In various embodiments, network connection criteria may be used to optimize use of a network connection based on the state of the network connection before sending data. FIG. 6 illustrates a high-level flowchart of various methods and techniques to implement evaluate network connection criteria for exporting data from a data stream at a local execution environment, according to some embodiments.

As indicated at 610, a data stream to send from an edge device to a target service or other data stream destination in a remote network may be selected by the edge device, in some embodiments. For instance, the various techniques discussed above with regard to FIGS. 1, 3, 4, and 5, may be applied to select the data stream. An evaluation of network connection criteria for the data stream may be performed, in various embodiments, as indicated at 620. The network connection criteria may be included as part of an export configuration and specify various network connection states that allow or deny export of data for a data stream.

For example, network connection criteria may specify a minimum available capacity or bandwidth of a network connection (e.g., at least 10 Mbps) which if not available would deny sending data from the data stream. To evaluate network connection criteria, a bandwidth value may be estimated according to historical throughput and load for data stream(s), in some embodiments, and compared with the minimum available value. In some embodiments, link costs may be defined or specified for certain types of network connections so that network connections with link costs that exceed a specified link cost, the network connection criteria may not be satisfied, such as where a link cost is high if offering a low capacity or expensive in time costs to operate (e.g., a satellite data communication link vs a wired data communication link). If the network connection criteria is satisfied, then as indicated at 630, data from the data stream to the target service or other data stream destination may be sent, in some embodiments. If not, another data stream may be selected to send, as indicated at 640 (e.g., according to the selection techniques at element 610.

Admitting, accepting, and/or storing received data from data streams may be configurable using export configuration for a data stream in some embodiments. Some export configurations may specify whether, for instance, data stream values can be overwritten. In some embodiments, admittance of data at a rate faster than a guaranteed or agreed throughput capacity (as specified in the export configuration) may result in throttling or other responsive actions to lower throughput to the agreed upon capacity. FIG. 7 illustrates a high-level flowchart of various methods and techniques to implement storing data received from a data stream at an edge device for export to a target service or other data stream destination, according to some embodiments.

As indicated at 710, data may be received from a data stream for export to a target service or other data stream destination in a remote network at a computing device in a client network hosting a local execution environment for the remote network. As indicated at 720, a utilization threshold may be applied to determine whether export storage at the computing device for the data stream (as well as other data streams) is above the utilization threshold. For example, if the amount of utilized capacity exceeds a threshold of 90% of available capacity, then further considerations may be taken before storing the data for the data stream. If not, then as indicate by the negative exit from 720, the data may be stored for export to the target service or other data stream destination.

As indicated at 730, a priority of the data stream may be evaluated according to an export configuration for the data stream, in some embodiments. For instance, the export configuration may specify a high priority or low priority value for the data stream. If the priority value is determined to be above a threshold amount or criteria, then priority to store the data may exist, as indicated by the positive exit from 740. If not, then the data may be dropped from the data stream, as indicated at 760. In some embodiments, instead of dropping the data, the data may over write stored data for that data stream. For instance, the data at the "head" or "front" of the stream to be exported that is stored at the edge device may be overwritten instead of dropping the data.

The methods described herein may in various embodiments be implemented by any combination of hardware and software. For example, in one embodiment, the methods may be implemented on or across one or more computer systems (e.g., a computer system as in FIG. 8) that includes one or more processors executing program instructions stored on one or more computer-readable storage media coupled to the processors. The program instructions may implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Embodiments of managed data export to a remote network from edge devices as described herein may be executed on one or more computer systems, which may interact with various other devices. One such computer system is illustrated by FIG. 8. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing device, computing node, compute node, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions that execute on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

Figure 8:
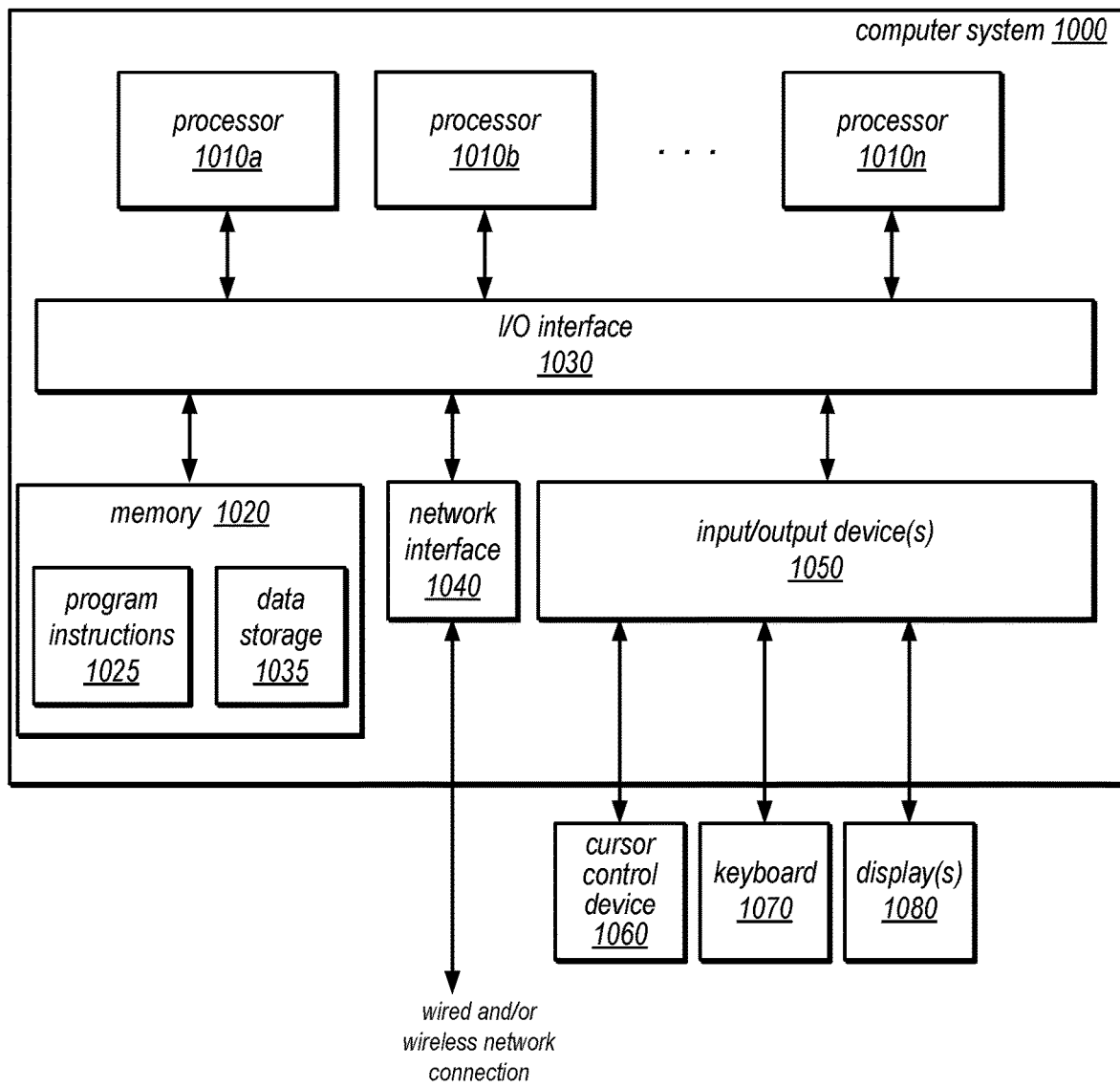
FIG. 8 illustrates an example system to implement the various methods, techniques, and systems described herein, according to some embodiments.

As shown in FIG. 8, memory 1020 may include program instructions 1025, that implement the various methods and techniques as described herein, and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may describe various operations that other systems may invoke, and may describe a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
    at least one processor; and
    a memory, storing program instructions that when executed by the at least one processor, cause the at least one processor to implement a local execution environment for a provider network that is implemented within a client network, the local execution environment configured to:
        receive a plurality of different data streams from a plurality of different devices in the client network;
        store the plurality of different data streams;
        reestablish a network connection between the local execution environment and a target service in the provider network;
        select one of the plurality of data streams to export from the local execution environment to the target service according to an export configuration;
        obtain a next portion of data stored for the selected data stream to send to the target service; and
        send the next portion of data to the target service in the provider network according to an interface for the target service.

2. The system of claim 1, wherein the local execution environment is further configured to:
    before storing data for at least one of the plurality of different data streams, determine that a priority specified for the at least one data stream allows the data to be stored when utilization of export storage for the plurality of data streams is above a utilization threshold.

3. The system of claim 1, wherein the local execution environment is further configured to:
    before sending the next portion of data to the target service in the provider network, determine that a network connection criteria specified for the selected data stream in the export configuration is satisfied.

4. The system of claim 1, wherein the target service is an Internet of Things (IoT) service offered by the provider network, wherein the local execution environment was deployed by the IoT service, and wherein the local execution environment is further configured to receive one or more requests from one of the client devices that specifies the export configuration.

5. A method, comprising:
    after reestablishing a network connection between an edge device in a client network and a data stream destination in a remote network:
        based on an export configuration, selecting, by the local execution environment, one of a plurality of different data streams received at the edge device from a plurality of devices in a client network connected to the edge device;
        identifying, by the edge device, a next portion of data from the selected data stream to send to the data stream destination; and
        sending, by the edge device, the next portion of data from the edge device to the data stream destination in the remote network.

6. The method of claim 5, further comprising:
    before selecting the one data stream:
        selecting, by the edge device, another one of the data streams to send to the data stream destination; and
        determining, by the edge device, that a network connection criteria specified for the selected other data stream in an export configuration for the selected other data stream is not satisfied; and
        wherein the selecting the one data stream is performed in response to the determining that a network connection criteria specified for the selected other data stream in the export configuration for the selected other data stream is not satisfied.

7. The method of claim 6, wherein determining that the network connection criteria specified for the selected other data stream in the export configuration for the selected other data stream is not satisfied comprises evaluating a link cost for the network connection.

8. The method of claim 5, wherein the export configuration specifies a priority for the selected one data stream, and wherein selecting the one data stream comprises comparing specified priorities for the plurality of different data streams to select a data stream with a highest priority.

9. The method of claim 5, wherein sending the next portion of data from the computing device to the data stream destination comprises sending the next portion as part of a batch of portions of data from the selected data stream.

10. The method of claim 5, further comprising:
    determining, by the edge device, that a priority specified for at least one of the plurality of data streams allows data of the at least one data stream to be stored at the edge device for later export when utilization of export storage for the plurality of data streams is above a utilization threshold.

11. The method of claim 5, further comprising:
    determining, by the local execution environment, that a priority specified for at least one of the plurality of data streams does not allow data of the at least one data stream to be stored at the edge device for later export when utilization of export storage for the plurality of data streams is above a utilization threshold.

12. The method of claim 5, further comprising:
    receiving, at the edge device, one or more requests to specify the export configuration from one of the client devices.

13. The method of claim 12, wherein sending the next portion of data from the edge device to the data stream destination comprises formatting the next portion of data according to an interface for the data stream destination.

14. One or more non-transitory, computer-readable storage media, storing program instructions that when executed on or across one or more computing devices cause the one or more computing devices to implement an edge device that implements:
    reestablishing a network connection between the edge device and a data stream destination in a remote network;

based on an export configuration, selecting one of a plurality of data streams received at the edge device from a plurality of devices in a client network including the edge device;

obtaining a next portion of data from the selected data stream received at the edge device to send to the data stream destination; and sending the next portion of data to the data stream destination in the remote network according to an interface for the data stream destination.

15. The one or more non-transitory, computer-readable storage media of claim 14, wherein the one or more non-transitory, computer-readable storage media store additional program instructions that when executed one or across the one or more computing devices cause the edge device to further implement:

determining that a priority specified for at least one of the plurality of data streams allows data of the at least one data stream to be stored for later export when utilization of export storage for the plurality of data streams is above a utilization threshold.

16. The one or more non-transitory, computer-readable storage media of claim 14, wherein the one or more non-transitory, computer-readable storage media store additional program instructions that when executed one or across the one or more computing devices cause the edge device to further implement:

before sending the next portion of data to the target service in the provider network, determining that a network connection criteria specified for the selected data stream in the export configuration is satisfied.

17. The one or more non-transitory, computer-readable storage media of claim 16, wherein, in determining that the network connection criteria specified for the selected data stream in the export configuration is satisfied, the edge device implements determining that a minimum bandwidth for sending the next portion of data via the network connection is available.

18. The one or more non-transitory, computer-readable storage media of claim 14, wherein the export configuration specifies the data stream destination of the remote network.

19. The one or more non-transitory, computer-readable storage media of claim 14, wherein, in sending the next portion of data to the data stream destination, the program instructions cause the edge device to implement sending the next portion as part of a batch of portions of data from the selected data stream.

20. The one or more non-transitory, computer-readable storage media of claim 14, wherein the sending the next portion of data to the data stream destination is performed by a connecter that was deployed to the edge device as part of a local execution environment from an Internet of Things (IoT) service and wherein the connector was a user submitted connector to the IoT service.

* * * * *